(12) United States Patent
Brunner et al.

(10) Patent No.: US 8,812,966 B2
(45) Date of Patent: *Aug. 19, 2014

(54) CONFIGURATOR USING STRUCTURE AND RULES TO PROVIDE A USER INTERFACE

(75) Inventors: Stephan Brunner, Lafayette, CA (US); George Kibilov, Santa Clara, CA (US); Elie Rassi, San Francisco, CA (US); Eugene Tchikowani, Cupertino, CA (US); Xiangyang Yao, Cupertino, CA (US); Peter Lim, Redwood City, CA (US)

(73) Assignee: Siebel Systems, Inc., San Mateo, CA (US)

( * ) Notice: Subject to any disclaimer, the term of this patent is extended or adjusted under 35 U.S.C. 154(b) by 481 days.

This patent is subject to a terminal disclaimer.

(21) Appl. No.: 12/871,339

(22) Filed: Aug. 30, 2010

(65) Prior Publication Data

US 2011/0202422 A1   Aug. 18, 2011

Related U.S. Application Data

(60) Continuation of application No. 11/321,216, filed on Dec. 28, 2005, now Pat. No. 7,788,591, which is a division of application No. 09/945,450, filed on Aug. 31, 2001, now Pat. No. 7,650,296.

(51) Int. Cl.
*G06F 3/00* (2006.01)

(52) U.S. Cl.
USPC .......................................................... 715/762

(58) Field of Classification Search
USPC .......................... 717/762, 763; 715/762, 763
See application file for complete search history.

(56) References Cited

U.S. PATENT DOCUMENTS

| | | | |
|---|---|---|---|
| 5,490,097 A | 2/1996 | Swenson et al. | 364/578 |
| 5,867,709 A * | 2/1999 | Klencke | 717/111 |
| 2002/0062475 A1* | 5/2002 | Iborra et al. | 717/108 |
| 2003/0074090 A1 | 4/2003 | Becka et al. | 700/83 |
| 2004/0205572 A1 | 10/2004 | Fields et al. | 715/513 |
| 2005/0102199 A1* | 5/2005 | Lee | 705/27 |

* cited by examiner

*Primary Examiner* — Thanh Vu
(74) *Attorney, Agent, or Firm* — Campbell Stephenson LLP

(57) ABSTRACT

A configurator using structure and rules to provide a user interface. According to one embodiment of the invention, a customizable product class is created. The customizable product class includes a set of one or more attributes to define the customizable product class. A component product class is added to the customizable product class, where the component product class is a subclass of the customizable product. A customizable class rule is associated to the customizable product class, the customizable class rule including expressions which provide conditions on component products added to the customizable product. A customizable UI is mapped to the customizable product class, where the customizable UI provides access structure to the configurator.

22 Claims, 6 Drawing Sheets

| Minimum Cardinality | Default Cardinality | Maximum Cardinality | System Adds Default Product? | User Pick Read? | Initial Solution | User Actions Allowed |
|---|---|---|---|---|---|---|
| =0 | = Min Card | >Default Card | No | No | No items | Increase item quantities to Max Card |
| =0 | > Min Card | =Default Card | No | No | N=Max Card | Decrease item quantities to 0 but cannot increase them. |
| =0 | > Min Card | >Default Card | No | No | N=Default Card | Increase item quantities to Max Card or decrease them to 0 |
| >0 | = Min Card | =Default Card | Yes | Yes | N=Min, Default, Max | Cannot increase or decrease item quantities. |
| >0 | = Min Card | >Default Card | Yes | Yes | N=Min | Can increase item quantities to Max Card but cannot decrease them. |
| >0 | > Min Card | =Default Card | Yes | Yes | N=Default | Can decrease item quantities to Min Card but cannot increase them. |
| >0 | > Min Card | >Default Card | Yes | Yes | N=Default | Can decrease item quantities to Min Card or increase them to Max Card. |

FIG. 4

CONFIGURATOR USING STRUCTURE AND RULES TO PROVIDE A USER INTERFACE

CROSS-REFERENCE TO RELATED APPLICATIONS

This application is a continuation of U.S. patent application Ser. No. 11/321,216, entitled "Configurator Using Structure And Rules to Provide A User Interface", filed Dec. 28, 2005, issuing on Aug. 31, 2010, as U.S. Pat. No. 7,788,591, naming Stephan Brunner, George Kibilov, Elie Rassi, Eugene Tchikowani, Xiangyang Yao, and Peter Lim as inventors, which in turn is a divisional of U.S. patent application Ser. No. 09/945,450, issued as U.S. Pat. No. 7,650,296 on Jan. 19, 2010 entitled "Configurator Using Structure And Rules to Provide A User Interface", filed Aug. 31, 2001 and naming Stephan Brunner, George Kibilov, Elie Rassi, Eugene Tchikowani, Xiangyang Yao, and Peter Lim as inventors. These applications are assigned to Siebel Systems, Inc., the assignee of the present invention, and are hereby incorporated by reference, in its entirety and for all purposes

FIELD OF THE INVENTION

The invention relates to the field of computing. More specifically, the invention relates to the generation of and provisioning of customizable products.

BACKGROUND OF THE INVENTION

The Internet has provided new opportunities for most companies to advertise and sell products to a multitude of consumers, however, companies that sell complex or customizable products still face significant challenges. Customizable products are products that are made up of other products or component products. Component products typically complement each other in creating the customizable product, potentially allowing consumers to receive discounted pricing when the components are purchased as a group.

Computer companies, for example, may sell disk drives and monitors as well as other types of computer components. These companies may also group computer components together to form computer systems at discounted prices. Customers who want to buy a computer system can select among several alternatives for each component. For example, the company may provide three monitors for the customer to choose from when buying a desktop computer. As the number of components making up the customizable product increase, the more complex the decision making process is for the consumer to determine which components to select.

Most businesses are supported by attentive sales professionals who help the customer select the product, or combination of products, that best meet their specific requirements. Buying and selling over the Internet is more problematic because an expert sales professionals is not available to guide customers to choose the right product. Providing online access to product information for each sub-component without an explanation of how the components interrelate is not enough. Customer loyalty can be very fleeting in today's highly competitive online environment and frustrated customers can easily look for alternatives at a competitor's web site. Preferably, businesses utilize, fully integrated processes and systems that can handle consultative selling, intricate configurations, and complicated product relationships and options.

To achieve this, organizations in all industries are increasingly using product and service configurators. A configurator is a software tool developed by the product or service provider, that allows customers to find the products that suit their unique requirements. In some cases, configurators are integrated with a set of business rules that help guide the customer as would a sales professional.

Today, however, configurators are simply point products that do not fully address the needs of organizations with complex, multichannel sales environments, and application integration requirements. These configurators often use complex procedural programming based modeling tools, to define product relationships and business rules, that are difficult to use, costly to maintain, and hard to upgrade.

These configurators are treated essentially as big shopping carts containing a bunch of pre-defined "bags", one for every possible component product. Consequently, the supported configuration rules only provide constraints to the total amounts of each component product to be added. Therefore, there are many configurators with configuration rule semantics which cannot be implemented well in such a weakly structured framework.

For example, suppose a configurator consists of computers and power supplies, where every computer must have a power supply. And further suppose that US computers require 110V power supplies while European computers require 220V power supplies. Here, current configurators have difficulty correctly modeling, for instance, an order having two computer systems, one for each locale. If a configuration rule denotes that mismatched computers and power supplies must exclude each other, then neither of the desired computer systems may be placed together in the same order. Yet if such a configuration rule did not exist then it would incorrectly allow configuring incompatible single systems. This is ultimately because the products are just "bagged together."

Another problem with procedural programming based configurators is the lag-time taken in making changes to the configurator. Configurators are normally designed and modeled with the help of an expert for the product being sold. Configuration experts, such as a sales professional or a product manager, explain to the software designer, the relationships between the component products in making the customizable product. Software engineers then program the software to present the products to the customer.

In many cases, the updating of a configurator consists of the software engineer(s) receiving the requested configurator changes from various configuration experts. The software engineer then reprograms the new components and/or configuration rules into the procedural programming-oriented source code of the configurator software. Therefore, there is usually a significant lag-time between a requested change to the configurator business model, and the time the software engineer reprograms the software.

Significant programming lag-time results in inaccessible and inaccurate information that extends sales cycles, increases the percentage of inaccurate quotes and orders, raises costs due to a greater number of returned items, and delays the timing in bringing new products to market. These inefficient and unreliable configurators often result in lost revenues and dissatisfied customers. As the rate of new customizable and component products increases these problems proliferate.

BRIEF DESCRIPTION OF THE DRAWINGS

The invention may best be understood by referring to the following description and accompanying drawings that are used to illustrate embodiments of the invention. In the drawings:

FIG. 4 illustrates several combinations for setting cardinality according to one embodiment.

DETAILED DESCRIPTION OF THE INVENTION

A method and apparatus to generate a customizable product configurator is described. In the following description, numerous specific details are set forth to provide a thorough understanding of the invention. However, it will be understood that the invention may be practiced without these specific details. In other instances, well-known circuits, structures and techniques have not been shown in detail in order not to obscure the invention.

The techniques shown in the figures can be implemented using code and data stored and executed on a computer. Such computers store and/or communicate (internally and with other network elements over the network) code and/or data using machine-readable media, such as magnetic disks; optical disks; random access memory; read only memory; flash memory devices; electrical, optical, acoustical or other form of propagated signals (e.g., carrier waves, infrared signals, lasers, digital signals, etc.); etc. Of course, one or more parts of the invention may be implemented using any combination of software, firmware, and/or hardware.

In one embodiment, the customizable product configurator is derived from an object oriented class hierarchy by a relational set of customizable and component classes (e.g. products or services) as will be further described. In one embodiment, the customizable product class includes attributes that defines the base structure of the customizable product. Component products, customizable class rules, and customizable user interface (UI) classes may be modeled as subclasses to, and inherit attributes from, the customizable product class. An instance of a customizable object may be generated from these classes when a consumer builds an instance of a customizable product.

Figure 1:
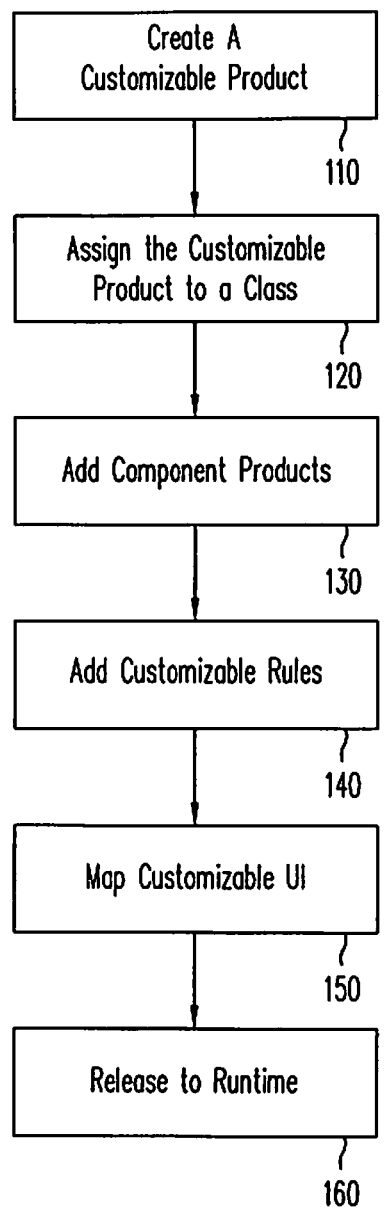
FIG. 1 illustrate a block diagram of the modeling of an object oriented configurator according to one embodiment.

In one embodiment, the configurator process is separated into two distinct sessions, the modeling session and runtime session. During the modeling session, a configuration expert (e.g. sales professional or product manager) designs the configurator. FIG. 1 illustrates a block diagram of the modeling of an object oriented configurator according to one embodiment of the invention. At block 110, a new customizable product is created with defined attributes and control passes to block 120. At block 120, the new customizable product is assigned to a class and control passes to block 130. This becomes the parent class in the customizable product class hierarchy.

At block 130, component products are added to the customizable product class and control passes to block 140. The component products are subclasses and inherit the attributes of the customizable product class. At block 140, customizable rules are added to the customizable product class structure and control passes to block 150. Here, the customizable rule may be designed by configuration experts, defining conditions and triggering actions between the component products that ensure the consumers purchase the optimal solution that meets their needs.

At block 150, the customizable UI is mapped to the customizable product class structure, thereby allowing the configuration expert to tailor the user interface of component products to the customizable product. Finally, at block 160, the configurator is released to a runtime session, allowing a consumer to build a customizable product.

As will be appreciated, the object oriented nature of the modeling session, such as the inheritance of class attributes and rules, lessens the complexity of building the configurator, allows for a configuration expert to make necessary changes to the configurator, and reduce the lag time from modeling to runtime.

During the runtime session, a consumer (e.g. one wanting to build a customizable product) accesses the configurator designed by the configuration expert to build a customized product or service. In one embodiment, the building of a customizable product is performed by the consumer through the UI designed for the specific customizable product class selected by the consumer. Upon, selecting specific component products or groups of component products to the customizable product class, other component products may be automatically added or restricted due to the rules defined, as will be further described. In one embodiment, a sales professional may also access the runtime configurator to help a consumer find the right product for their needs. In this way, the configuration expert has the most up-to-date products and quote list to design a customizable product.

Although the following will be described in relation to products (e.g. customizable products, component products, etc.), it should be understood that the customizable product configurator described is not limited to only products and may be used to customize other instances (e.g. services). In addition, alternative embodiments of the configurator may also comprise any number of various types of products or services such as literature and contracts, and is not limited to those examples described herein.

In one embodiment, the customizable product configurator is generated from customizable product classes and subclasses that are organized into the customizable product hierarchies. The customizable product classes defined during the model session may represent any number of instances (e.g. a computer system instance, a car instance, for example) or types of instances (e.g. Model X computer system, Model Y computer system, for example). In one embodiment, when a customizable product class is designed, the customizable product class name attribute is unique and the customizable product class name is added to a set of available customizable classes. Thereafter, all of the associated component products, customizable class rules, and customizable UIs designed become subclasses to the customizable product class.

Figure 2:
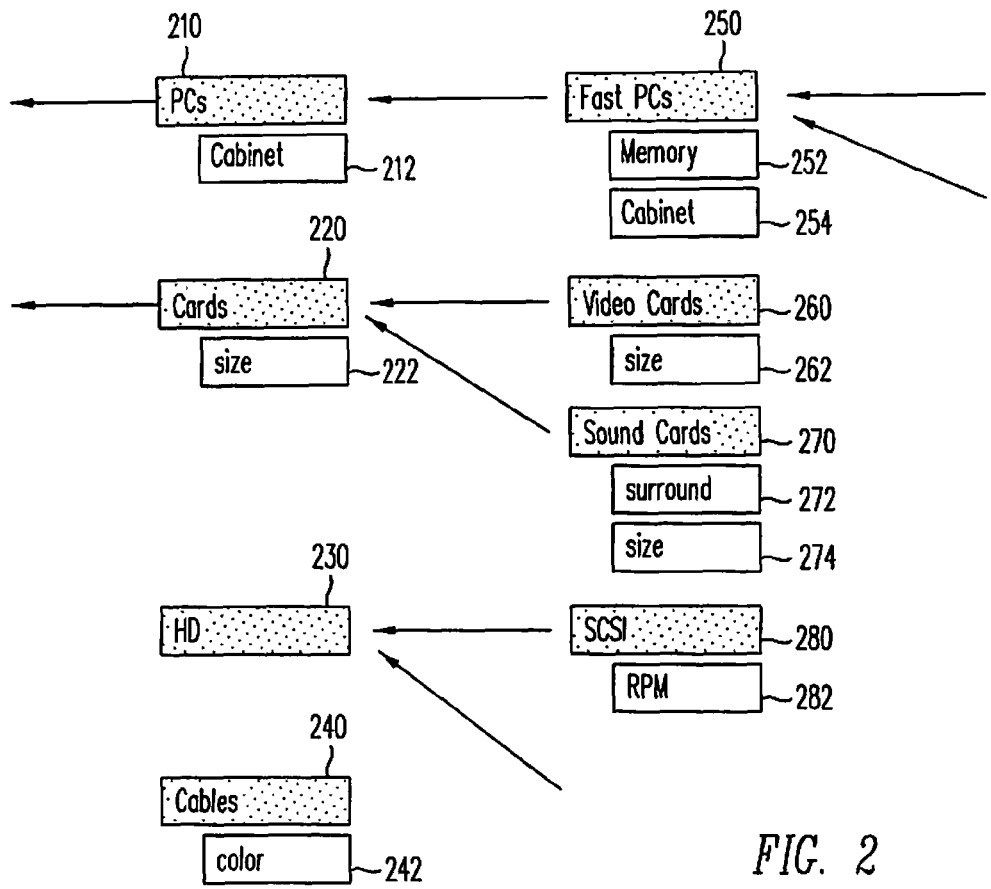
FIG. 2 illustrates a class hierarchy with defined attributes for a customizable product according to one embodiment.

FIG. 2 illustrates a class hierarchy with defined attributes for a customizable product according to one embodiment. Here, the customizable product classes are modeled as PCs 210 with attribute Cabinet 212, Cards 220 with attribute Size 222, HD 230, and Cables 240 with attribute Color 242.

The PCs 210 has a component product subclasses defined as Fast PCs 250 with attributes Memory 252 and Cabinet 254. The Cards 220 have two component product subclasses defined as Video Cards 260 and Sound Cards 270. The Video Card 260 has attribute Size 262 and Sound Cards 270 has attributes Surround 272 and Size 274. The HD 230 has a component product subclass defined as SCSI 280 with a defined attribute RPM 282.

Typically, a class hierarchy consists of classes and subclasses. Subclasses are classes that are defined within another class. For example, in FIG. 2, Video Cards 260 and Sound cards 270 are subclasses of the customizable product class Cards 220 which would inversely be the parent class of Video Cards 260 and Sound cards 270. Subclasses always have a parent class and classes can be nested to as many levels as needed. In one embodiment, the classification scheme used for setting up a customizable product class hierarchy depends on the product line, the business processes, and the marketing and selling to be customized. For example, one could create a customizable product class called disk drives that contains all the disk drives in a product line. The key characteristic of a component product class is that membership is species-based. All the members are the same species. For example, all the members of class HD 230 are disk drives.

In one embodiment, component product classes are the related products associated to a customizable product class. That is, component products make the customizable product customizable. A component product class may be added to the customizable product class one at a time, or as a group. For example, a car may be defined as a customizable product class having a car tire defined as a component product class. The car tire may be added one at a time, or a group of four tires may be added at once.

Similarly, in one embodiment, a component product class may also include other customizable products. In this way, a customizable product is a sub-assembly that is included as a component product in a final customizable product. For example, assume that a configurable power supply and a configurable gearbox are sold as part of an industrial lathe. One customizable product may be created for configuring the power supply and one for configuring the gearbox. Then both of these component customizable products may be added to the industrial lathe customizable product as subclasses.

In one embodiment, when a component product class is defined as a subclass, of a specified parent class (e.g. customizable product class or other component product class) the parent class is defined within the parent class attribute of the subclass. When a component product class is added to a customizable product class hierarchy, it automatically inherits all the attributes of the parent class or classes. Customizable product classes let you define what attributes are maintained for component product classes, propagate those attributes to the component product classes, and maintain those attributes in a consistent fashion.

Each customizable product class is associated with a collection of attributes during modeling. Attributes are the defined types of information to be captured and maintained about the customizable product classes and subclasses, and the component product classes and subclasses. In one embodiment, each attribute has a name or identifier, a data type, and a value from a specified domain or range.

When an attribute for a customizable product class or subclass is defined, the attribute is inherited by all its member component product classes and all member subclasses. In one embodiment, attributes are defined at the customizable product class level but not at the component product class level. For example, in FIG. 2, the Fast PCs component product subclass has defined attribute Cabinet 254 which is inherited from the attribute Cabinet 212 in the parent class PCs 210.

Defining attributes at the customizable product class or subclass level allows the creation and management of attributes for a plurality of component objects to be more efficient. Also, the customizable product classes provide a central location for propagating attributes to component products and shuffling attributes between customizable product classes during the building and revising of the class hierarchy.

It will be appreciated, however, that attributes need not only be defined at the customizable product class level, and in alternative embodiments attributes may also be defined at the component class level. In one embodiment, when an attribute is defined at the component class level, the attribute is static and does not inherit from its parent class. Here for example, in FIG. 2, the value stored in the attribute Cabinet 254 of the subclass Fast PCs 250 would be different from the value stored in attribute 212 of the parent class PCs 210.

Also, the Memory 252 attribute defined only for the subclass Fast PCs 250 is another example of an attribute defined solely for the subclass and not the parent class. When a new attribute is explicitly defined for a customizable or component product subclass, it is said to "shadow" the inherited attribute.

In one embodiment, each customizable product class is associated with a predefined set of attribute-value pairs. The value of the attribute is assigned at the component product class object level. The predefined set of attribute-value pairs store the run-time session data about that customizable product class and its relationship to other customizable product classes. Therefore, values of attributes may vary from component product class to component product class in the customizable product class.

In one embodiment, attribute data types include: Numbers, Integer, Floating-point, Enumeration, String, Date, Time, Currency, Phone, Boolean, etc. In one embodiment, attributes whose values are quantitative have an associated data type. That is, only quantities of a specific data type appears as the value of an attribute. The value of the attribute may also be for a quantity (of various data types) or a group consisting of a group of component product classes within the customizable product class. Attributes whose values are groups of component product classes are called ports as will be further described below.

In one embodiment, a domain of allowable values for an attribute may be defined. Attributes can have three types of domains: a single value, a list of values, or a range of values for an attribute. For example, an attribute called Color could have the domain red, green, blue. In one embodiment, a default value of the attribute may be defined.

Attributes can be further classified in various ways. In one embodiment, attributes are divided into fixed and dynamic attributes. Fixed attributes' values are completely determined within the modeling session, while dynamic attributes' values are determined during the runtime session.

In one embodiment, the component product classes may be grouped together into a list of component products or ports. All component product classes contained in a port are of the same type. The port can be characterized by the number of component products it contains. Port attributes, whose values are groups of component product classes, are typed with a customizable product class. Only component product classes that are a subclass of a customizable product class may appear in the group of values for that attribute.

Figure 3:
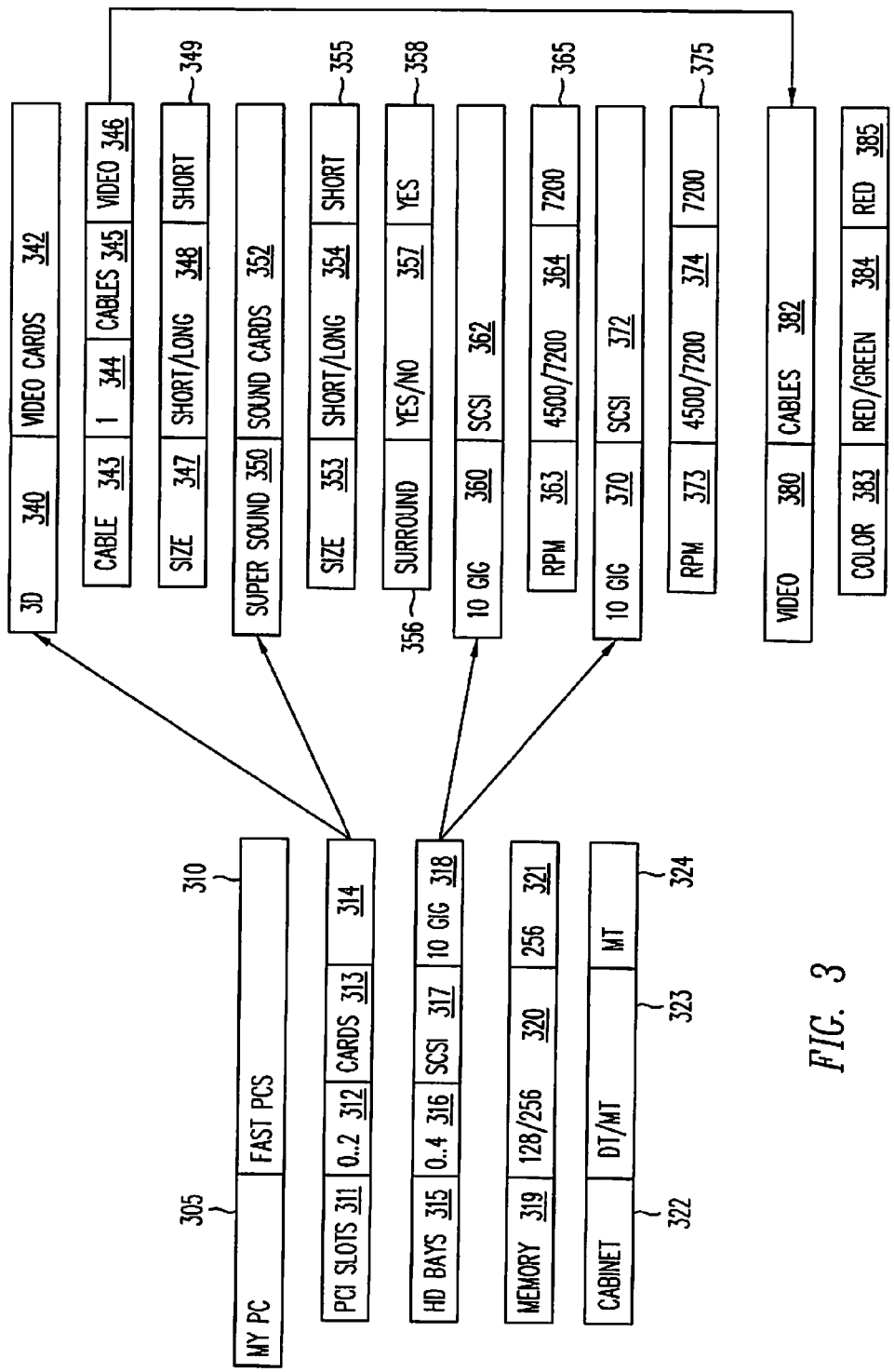
FIG. 3 illustrates an exemplary class hierarchy including port attributes according to one embodiment.

FIG. 3 illustrates an exemplary class hierarchy including port attributes according to one embodiment of the invention. FIG. 3 contains the Fast PCs 310 component product which is a subclass of My PC 305 with the defined attributes of Memory 319 and Cabinet 322. Two ports, PCI Slots 311 and HD Bays 315 are also included. Here, the PCI Slots 311 and HD Bays 315 represent that the Fast PCs 310 may be customized with multiple PCI Slots and Hard Drive Bays. The attributes of these ports also describe the cardinality (elements 312 and 316), the domain values (elements 313 and 317) type of component products types which may be associated with the port, and the default domain value (elements 314 and 318). Here, the cardinality value 312 defines that the PCI Slots 311 may have 0 to 2 of the domain value 313 defined as cards installed with no default domain value 314 defined. The cardinality value 316 defines that the HD Bays 315 may have 1 to 4 of the domain value 316 defined as SCSI hard drives installed with the default domain value 318 defined to be 10 Gig. Further description of the use of cardinality is described below. The attribute Memory 319 has domain values 320 defined as 128 and 256, with the default value 321 defined as 256. The attribute Cabinet 322 has the domain value 323 defined as DT or MT, with the default value 324 defined as MT.

FIG. 3 also describes the types of cards which may be installed in the PCI slots. Here, Video Cards 342 are a subclass of class 3D 340 cards and Sound Cards 352 are a subclass of class Super Sound 350. Both Video Cards 342 and Sound Cards 352 are ports of cards which may be installed in the PCI slots. The Video Cards 342 also has defined another port Cable 343 and an attribute Size 347. The attribute Size 347 has the domain values 348 defined as short or long, with the default value 349 defined as short.

The Sound Cards 352 subclass has the attributes Size 353 and Surround 356 defined. Size 353 has the domain values 354 defined as short or long, with the default value 355 defined as short. Surround 356 (e.g. surround sound) has the domain value 357 defined as yes or no, with the default value 358 defined as yes.

As described above, the port Cable 343 contains attributes which describe the types of component product classes which may be associated with the port. Here, the Cardinality 344 is defined to include one of the domain value 345 defined as cables. Here, the default value 346 is defined to the port Video 380. The port Cable 343 is then associated with the Cables 382 subclass of Video 380, which contains the attribute Color 383 having the domain values 384 defined as red and green, with default value 385 defined as red.

Returning to the description of the HD Bays 315, the port includes a SCSI 362 subclass to 10 Gig 360 with the attribute RPM 363 defined and SCSI 372 subclass to 20 Gig 370 with the attribute RPM 373 defined. Both attributes RPM 363 and RPM 373 have domain values 364 and domain values 374 defined as 4500 and 7200, with both default value 365 and default value 375 defined as 7200.

In one embodiment, ports are generally inclusive by default, but also may be defined as exclusive, which means that any component product class which appears in that port will not appear in the ports of any other component product class object (however it may appear in other ports of that same component product class).

Pairs of port properties can also be defined as inverses. A port which is one of the attributes of an inverse pair will only contain component product classes which possess the other attribute in that pair. For example: if Husband and Wife are defined to be inverse properties and if, for instance, John's Wife is Mary then Mary's Husband is John.

It should be understood that inverse properties can be one-to-one, as in the example above, or they can be many-to-one, one-to-many or many-to-many. No matter how many classes are involved, an inverse port essentially defines just two sets of component product classes, such that each set appears as the value of the corresponding attribute for every member of the other set. For a many-to-many example: Sellers and Buyers might be defined as inverses. Then each Seller would have access to the common group of Buyers, and each Buyer would have access to the common group of Sellers. In one embodiment, the ports in an inverse property pair can each be independently defined as either inclusive or exclusive.

For a one-to-many example with both inclusive and exclusive ports, the wheels port of a car should be exclusive, so that the four wheels belong to just a single car, but the car port of each wheel would need to be inclusive, so that all the wheels could be attached to the same car.

In one embodiment, ports have cardinality. When a port is defined a minimum, maximum, and default cardinality may be specified. Cardinality refers to the quantity of the component product class a consumer can select from a port during the runtime session. For example, assume a port called Hard Drives is defined. It contains a 20 GB drive and a 30 GB drive. If the minimum cardinality is set to 2, the consumer must pick 2 items from this port. The consumer can do this in any of the following ways: Pick one 20 GB drive and one 30 GB drive; Pick two 20 GB drives; or Pick two 30 GB drives.

In one embodiment, there are three types of cardinality: minimum, maximum and default. FIG. 4 illustrates several combinations for setting cardinality according to one embodiment of the invention. The figure describes what will be displayed initially to the consumer in the configurator and the actions the consumer may perform according to one embodiment. N is the quantity of the default component product class in the configurator. In all the cases where the minimum cardinality is greater than 0, the consumer may substitute other component products for the default product.

The minimum cardinality governs whether or not selecting component product classes from the instance port is optional or is required. If the minimum cardinality is set to 0, selecting component product classes is optional. If the minimum cardinality is set greater than 0, the selected number of component product classes from the port must be selected.

The maximum cardinality sets the maximum number of component product classes that the user can select from a port during the runtime session. If the minimum cardinality is set greater than zero, the maximum cardinality must be set to a number at least as large.

The default cardinality specifies what quantity of the default component product class is automatically added to the initial configuration during the runtime session. In one embodiment, default cardinality must be equal to or greater than the minimum cardinality and must be less than or equal to the maximum cardinality.

In one embodiment, a component product class includes a collection of expressions, called the customizable class rules. The customizable class rules define constraints on component products. It is through the customizable class rules that the configuration expert helps guide the consumer to choose the appropriate product(s) for their needs. Here, the customizable class rules may be defined to require or exclude the selection of one or more component products upon the selection of a specific component product, or the customizable class rule may trigger the prompting of recommendations messages when a particular component product is selected. For example, a customizable class rule may be created that requires a specific monitor card when a specific type of monitor is selected during the runtime session by a consumer. In one embodiment, the required monitor card is automatically added to the runtime session of the configurator when the consumer selects that monitor.

In one embodiment, customizable class rules are inherited, but unlike attributes, the collection of customizable class rules are not named and do not shadow. However, it should be understood that in some embodiments customizable class rules may be named and/or may be shadowed. If a component product class adds new customizable class rules they simply "accumulate" downwards in the class hierarchy. A subclass possesses all the customizable class rules of its parent class, plus any new customizable class rules added by that subclass.

As stated above, the customizable class rule has a collection of expressions. In one embodiment, an expression is a template composed of property paths and constants that are combined together with operators. Expressions can be evaluated to implement customizable class rules constraints during the runtime session. Each evaluation is performed in some particular context, which resolves the meaning of any free references made in the expression. The nature of the constraints produced by an expression depend on the environment in which the expression is evaluated.

In one embodiment, configuration experts build customizable class rules by natural language templates. Here, templates are fill-in-the-blank natural language sentences that configuration experts complete using rule builder tools. Their purpose is to completely shield the configuration experts from customizable class rule assembly language which may need to be modified by a software engineer. The natural language template may use easy to understand and fully internationalizable natural language sentences that an configuration expert may implement. Some examples of template expressions are:

"Component Product 1 requires Component Product 2"

"Make sure that the quantity of a component product is less than a number"

"If the customer picks more than 50 of a component product, then include the Good Customer Bonus Pack for free"

"Add the quantities of one component product and another component product and then subtract the total from the quantity of a third component product"

"Sum of a number and a number"

"Product of a number and the absolute value of a number"

Configuration experts may select a natural language template and then fill in the blanks with defined classes and attributes (e.g. component classes and attributes), math expressions, or other templates. Then, the natural language customizable class rules are converted into a low-level rule assembly language. Here, a combination of math expression builders and natural language phrase builders may be used to let configuration experts create complex rules with minimal typing.

In one embodiment, batch customizable class rules may be used, which allow configuration experts to enter lists of values to fill in the blanks of any template in one step. Batch rules are particularly useful for creating large numbers of rules for a single component product class. Also, predicate-based customizable class rules design may be used, allowing configuration experts to build large customizable class rule sentences by combining condition and action phrases. For example, "If a user picks Computer X And configurator contains 3 of Software Titles And Account Type="Good Customer" Then autopick free upgrade And autopick promo mousepad Except when attribute Shipping destination is Texas".

It should be understood that although various rule builder have been described the invention is not limited to any type of rule builder whether using natural language or low-level rule assembly language. In one embodiment, all templates and translations are defined in the database. This way, configuration experts may add any proprietary and non-proprietary templates using any template designer tool without limiting the invention.

As stated above, an expression may be partially composed of property paths. A property path refers to the attributes of component product classes which may appear during a runtime session in the ports of other component product classes (and may themselves contain yet other component subclasses, etc). For example, ports in a configuration such as My Printer My Printer's Power Cord My Printer's Power Cord's Wattage

. . .

Would be referred to with the following property paths that could be written as

[MyPrinter]

[MyPrinter].[Power Cord]

[MyPrinter].[Power Cord].[Wattage]

. . .

Basically a port or attribute may be referred to (in this notation) by the name of the port or attribute, prefixed by a path that accesses the class of interest having that port or attribute. In these examples, the base access path is the port [MyPrinter] which is assumed to refer to some group of printers.

A base path must always be interpreted with respect to a context defined by some particular product class. How the context is determined will be discussed further below. If the base path accesses a group of product classes (such as the value of a port, or a subclass subgroup of a port) then a port (such as [Power Cord] above, which is assumed to be an subclass of [MyPrinter]) can be referred to by appending the name of the port to the path.

If a path accesses an attribute which is also a port then additional facilities exist to allow access to the members of that port, their members, etc. First, attributes of component product classes in the port can be referred to by further extending the path (as with [Wattage] above, which is an attribute of [Power Cord]).

Second, since in one embodiment, the value of a port is always a group of component product classes then any subclass can be accessed simply by qualifying the port name with the subclass name. For example:

[MyPrinter]: [HP LaserJet].[PowerCord]

refers to the subclass of power cords of just the HP laser printers.

Third, the individual members of the group can be accessed by appending the index of the member. For example,

[MyPrinter]#2.[PowerCord]

refers to the power cord(s) attached to the second printer in the group.

These access paths can be freely combined and extended to any degree (always reading from left to right in this notation). For example,

[MyPrinter]:[HP LaserJet]#2.[Cable]:[Serial]#1 refers to the first serial cable attached to the second HP printer.

In one embodiment, any path which doesn't end by referring to an attribute value refers to a group of component product classes. It can refer to an empty port, a group with a single member, or a group with multiple members.

In one embodiment, merely referring to an empty port will not constrain the port to have any component product classes. That is, a customizable class rule about [CPU]#1000 may only be effective when the configuration is known to have at least one thousand CPUs. However, if no constraint has required that the thousandth CPU be present, then this path, by itself, will merely refer to an empty port (a port which does not have any instances in it just like any other port). Conversely, to cause a referenced component product class to exist, either the quantity of the entire group must be constrained to a sufficiently large positive value, and/or the quantity of the indexed port must be constrained to be non-zero.

In one embodiment, the attributes and ports referred to in a path must be attributes or ports that are actually defined in the class hierarchy being referred to. In order to refer to an attribute or port that is only defined for a subclass it is necessary to "downcast" the path to a subclass subgroup. In one embodiment, a "downcast" path will thus refer to an empty group when no objects of that subclass are present.

In one embodiment, new operators may be defined by assigning an expression template to an operator property. The name of an operator property may be used as an operator in expressions of any class for which that operator is defined. Here, an operator property is inherited or shadowed by subclasses. In one embodiment, an operator property is similar to procedures and methods in object-oriented programming. For example, a MutuallyRequires operator property may be defined as follows:

```
op MutuallyRequires (x, y)
{
    req(x,y);
    req(y,x);
}
```

With this definition, a MutuallyRequires constraint may be conveniently added by applying the operator to any two expressions of interest.

A more complex example models a MatchingProperty rule, which constrains any selections within two given categories to require matching values for some given property:

```
op MatchingProperty (catA, catB, prop)
{
    int propValue;
    withParts((catA),
        req(%1,==(prop Value, %1.prop)));
    withParts((catB),
        req(%1,==(prop Value, %1.prop)));
}
```

Although examples of the operator property have been defined using a given syntax, an alternative syntax may be used to fulfill the nature of the operator property and the invention is not limited to the syntax described.

In one embodiment, third party scripts may also be used to interface the configurator with other software applications. Here, scripts can be associated with customizable or component product classes and can be set to trigger when certain defined events occur as would customizable class rules, however, the scripts may be used to perform actions outside the configurator. In one embodiment, scripts are sequential programs which are run when certain events occur. For example, when the user selects certain component products a script may be created to add additional information in the current shopping basket or quote and/or interface with other external applications. It should be understood that although scripts and customizable class rules are described to perform different tasks, in alternative embodiments, the customizable class rules place constraints and perform sequential actions on both the configurator and other applications.

In one embodiment, configuration experts may design a customizable graphic user interface (UI) for the object oriented configurator. The customizable UI interfaces to the customizable class hierarchy and allows the configuration expert to customize the presentation of component products. For example, a configuration expert may model a customizable UI for a particular product line or customer base. Here, each configuration model has a custom UI class from which the runtime session will dynamically generate a UI. The following describes a HTML based UI class, however, other languages such as JAVA applets, Microsoft ActiveX, and standard XML may also be used to generate the UI.

The UI declarations include three component types (UI classes): Themes, Groups, and Controls.

Figure 5:
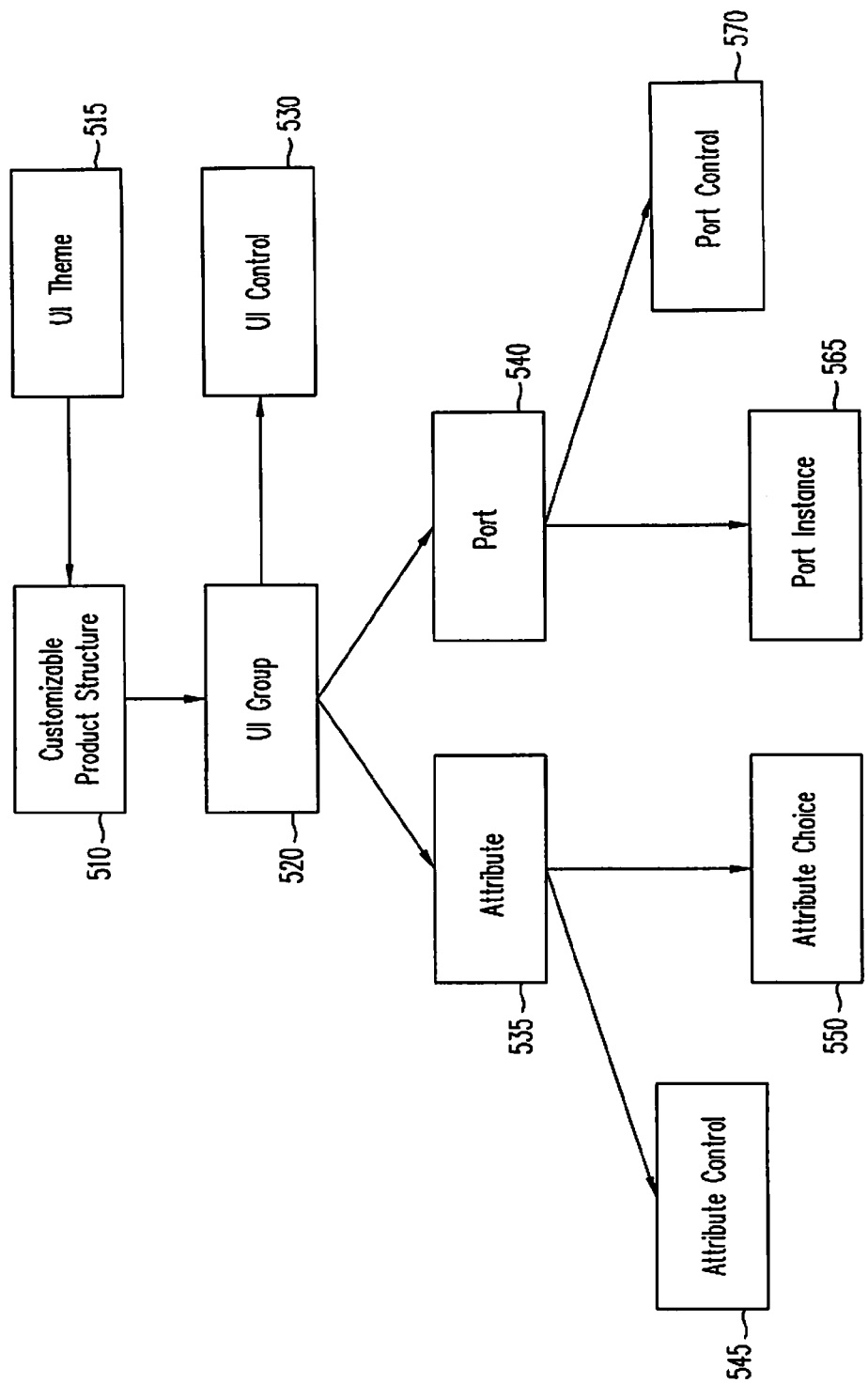
FIG. 5 illustrates the customizable UI class hierarchy according to one embodiment.

FIG. 5 illustrates the customizable UI class hierarchy according to one embodiment of the invention. Here, a customizable product structure 510 is associated with a UI theme 515. The UI theme 515 defines the appearance of the customizable product class within the UI. Examples of the UI theme 515 presentation styles include: tab style, wizard style, or tree style. These UI theme presentation styles may also have properties associated with them such as background color, fonts, multi-lingual text, among others for example. In one embodiment, UI theme 515 properties are stored as name value pairs. However, in one embodiment, each customizable product structure 510 has exactly one UI theme 515.

The customizable product structure 510 may also be associated with a UI group 520. The UI group 520 includes a collection of UI controls 530. In one embodiment, UI group 520 holds one or more UI controls 530. For example, in case of a tab style theme, UI group 520 represents a single property sheet where various component product classes may be defined and sequenced within various grouping orders. In one embodiment, grouping order may be different from the group of component product classes of port 540 as will be further described below.

A UI control 530 may be associated with a specific UI theme and customizable product structure 510. UI controls 530 are UI building blocks such as drop downs, radio buttons, and list boxes. These UI controls 530 may also be defined with specific properties such as fonts. In one embodiment, UI control 530 reflects the runtime session's state model for the individual component product classes that UI control 530 have been assigned to. For example, a drop down list control, upon a specific condition may contain varying data depending on whether the condition is met.

The UI group 520 may include an attribute 535 or port 540. The attribute 535 may include an attribute control 545 or an attribute choice 550. An attribute control 545 allows the UI to display an attribute in terms of simple fields, drop down boxes, radio boxes, and list boxes. The attribute choice 550 allows for the manner in which the attribute is displayed, such as its color.

The UI group 520 may also include one or more ports 540. Here, the port 540 may include one or more component products represented in port instance 565. Port control 570 allows the UI to display the port instance 565 with drop down boxes, radio boxes, and list boxes.

Figure 6:
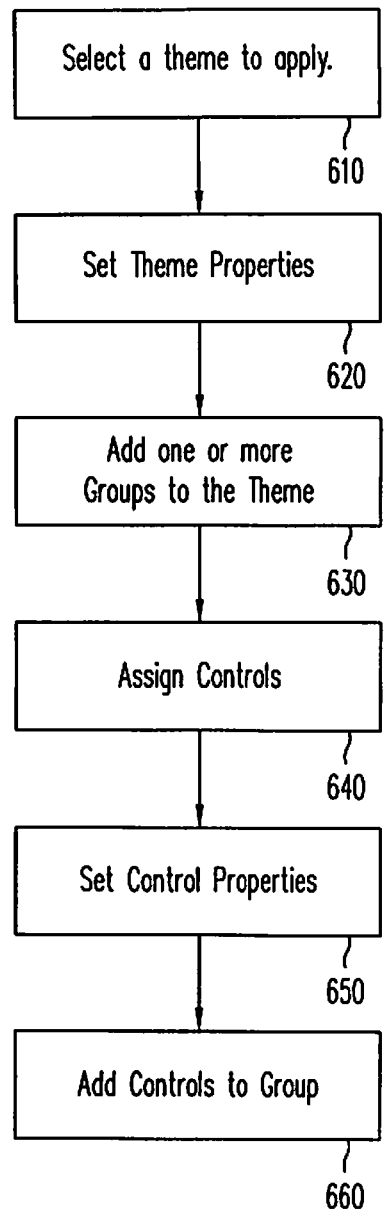
FIG. 6 illustrates a block diagram of the creation of a UI for using defined customizable class structures according to one embodiment.

FIG. 6 illustrates a block diagram of the creation of a UI for using defined customizable class structures according to one embodiment of the invention.

In one embodiment, after designing a customizable class structure, configuration experts have the option to customize the runtime UI for the newly created design or have a default UI design applied. The default UI design in this embodiment is a tree style. Declaring the UI includes the following:

In block 610, A UI theme is selected from a set of pre-defined themes. Control then passes to block 620.

In block 620, UI Theme properties are set. Control then passes to block 630.

In block 630, One or more UI groups are added to the newly selected UI theme. Control then passes to block 640.

In block 640, UI controls are assigned from the set of available controls to defined component products. UI control then passes to block 650. This block may be by-passed if the UI control does not require property update.

In block 650, the UI controls are assigned properties. Control then passes to block 660.

In block 660, The UI controls are added to the UI groups.

Figure 7:
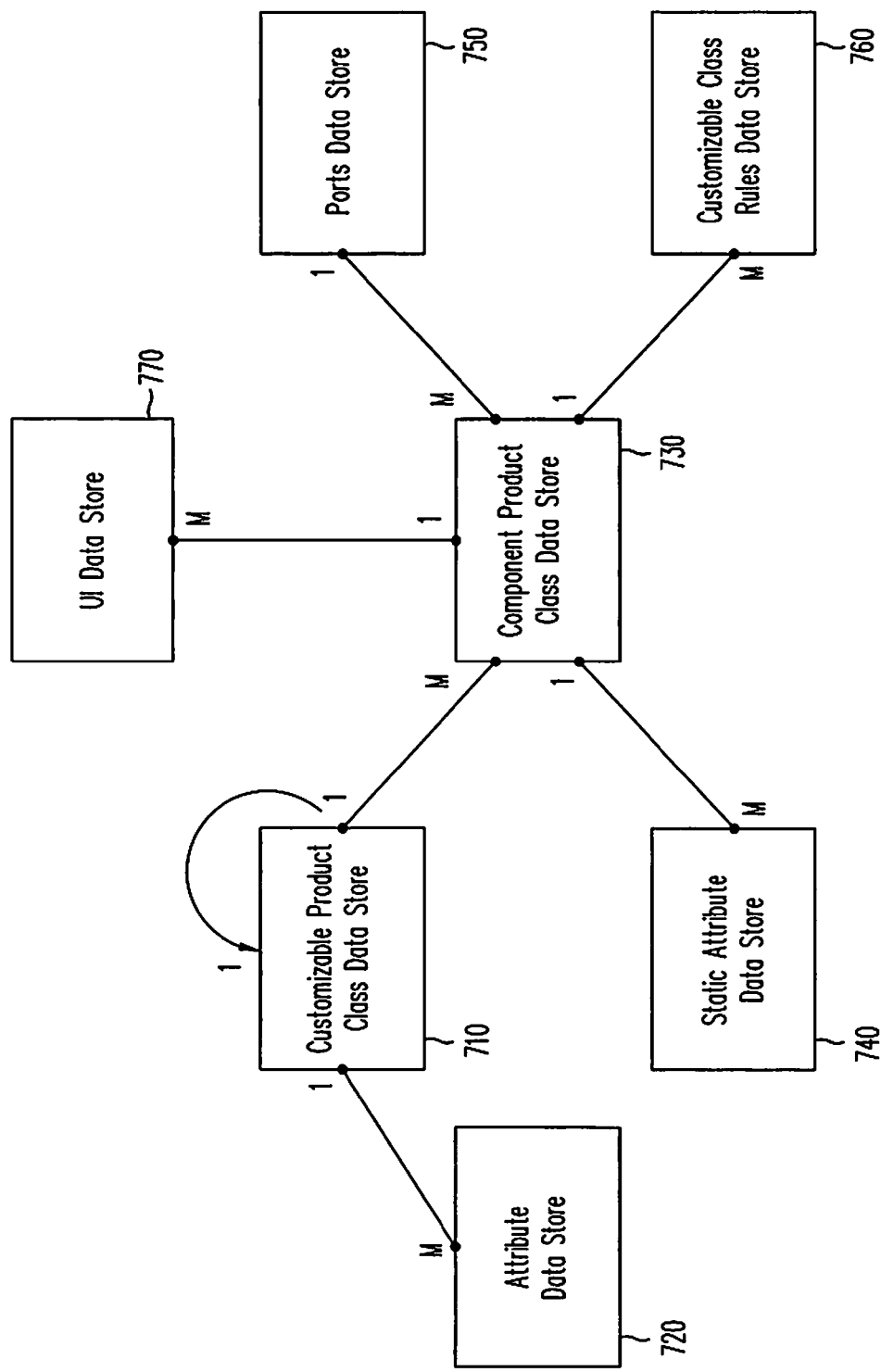
FIG. 7 illustrates a data store for various components of the configurator according to an embodiment.

In one embodiment, once the defined customizable product class structures, customizable class rules, and UI classes are designed they may be stored within one or more data stores. FIG. 7 illustrates a data store for various components of the configurator according to an embodiment of the invention. The figure includes the Customizable Product Class Data Store 710, the Attribute Data Store 720, the Component Product Class Data Store 730, the Static Attribute Data Store 740, the Ports Data Store 750, the Customizable Rules Data Store 760, and the UI Data Store 770.

In one embodiment, the data store represents a relational database where the customizable product classes attributes in the Customizable Product Class Data Store 710 have a one to many relationship to attributes in the Attribute Data Store 720. The Customizable Product Class Data Store 710 stores the customizable product classes and the Attribute Data Store 720 stores the attributes defined for a customizable product. As noted above, in one embodiment, the attributes are defined at the customizable product class level, thereby, the Attribute Data Store 720, in FIG. 7, has a relationship to the Customizable Product Class Data Store 710 and not the Component Product Class Data Store 730.

The Customizable Product Data Store 710 also has a one to many relationship between the Component Product Class Data Store 730. The Component Product Class Data Store 730 stores the component product classes and the relationship represents that one or more component products make up the customizable product. In addition, the Customizable Product Data Store 710 has a one to one relationship to itself, because the customizable product may consist of a customizable product.

The Component Product Class Data Store 730, has a one to many relationship to the Static Attribute Data Store 740. The Static Attribute Data Store 740 stores the static attributes of component product classes that are not viewable to the customizable product class according to one embodiment. The Component Product Class Data Store 730, also, has a many to one relationship with the Ports Data Store 750. The Ports Data Store 750 stores instances of component product classes and represents that many of the component products may be stored in the Ports Data Store 750, in one embodiment, to group like class types together.

The Component Product Class Data Store 730 has a one to many relationship to each customizable class rule stored in the Customizable Class Rule Data Store 760. Also, Component Product Class Data Store 730 has a one to many relationship to the UI Data Store 770, storing the various UI types to be defined for each component product defined.

Multiple designs for various types of complex customizable products may be designed for and stored within the data stores. In addition, various versions of a single model may also be designed and stored. In one embodiment, an instance of a customizable product includes its own unique identity, individual characteristics, and explicit relationships with other component products, customizable class rules and UI within the customizable product.

In one embodiment, the data store may consist of a database management system, such as a relational database management system or an object oriented database management system, however, alternative database management systems that are well known in the art may also be used.

In one embodiment, a single instance of a special class, called the basket, implicitly exists in every configuration. The basket has a single special (anonymous) "universal port", whose class is the root class of the model. This universal port contains every class in the configuration.

The basket may have other properties as well, such as global attributes of the configuration. In one embodiment, the property paths begins with a $ when referring to the basket. If the $ is followed by the name of an attribute, operator template, or port it refers to a global attribute of the entire configuration. For example:

$[TotalPower]

might refer to a resource giving the total amount of power needed by the configuration.

Alternatively, if the $ is followed by the name of a class, it refers to the subgroup of component product of that class in the basket's "universal port". For example $[Printers]

refers to the quantity of the entire Category of Printers, while $[HP LaserJet]

refers to the quantity of just that particular kind.

The basket allows the user to get a configuration started from an empty initial state. For example entering a request like 1 QTY_LE $[HP LaserJet]

means that there is at least one HP printer in the configuration. Following this with $[HP LaserJet]#1.[Aux Paper Tray] QTY_EQ 2 causes that first instance to have exactly two auxiliary paper trays, and so on.

The basket also allows the user to connect previously existing parts. For example if later in the session a CPU is created the printer above can be attached by submitting a request like $[HP LaserJet]#1 GRP_EQ $[CPU]#1.[Printer].

In one embodiment, linked component products provide access to other types of information besides products. Links may be defined links to fields in a business component, links to the login name of the user, or links to the current system date. For example, links to an external user administration system may determine whether a specific user may purchase a component product at a specific price. This allows one to write rules that are conditioned on business component fields, login names, or system dates, among other examples.

After the configuration expert models the customizable product, a consumer or salesperson may build an instance of a customizable product object from the object oriented classes described above. Here, the customer creates a new customizable product object from the customizable product class instance by its unique name. Then, depending on the component product classes selected to the customizable product object, specific customizable class rules are triggered or UI classes displayed.

For example, a consumer may select a computer system (e.g. customizable product instance) from a tab style UI that provides a drop down list of various computer systems for sale. Upon selecting a computer system, the consumer may explore options or make trade-offs by adding component products to the computer system such as, monitors, hard drives, and CD-ROMs, each of which may be displayed within its own UI (e.g. HTML page). Upon selecting some component products, the customizable class rules may restrict the addition of specific component products to the computer system, as would an experienced sales professional, guide a customer through highly complex product relationships.

In one embodiment, during the runtime session the customizable product object is generated and resides in memory. Upon the selection of a component product object, a unique ID is assigned to each object associating it with the customizable product instance. Also, values are paired with each attribute of a component product object, where, the type of value that is associated with the attribute is determined by the definition of the attribute assigned during the modeling session. The new customizable product instance may then be stored in a data store. In one embodiment, to receive the stored customizable product object from the data store, the associated unique ID is used to iterate over each component product object, outputting the ID assigned to the component object, the object's class and the attribute-value pairs for that component object.

It should be appreciated that the embodiments described allow greater freedom to sales professionals to implement a customizable product configurator. Sales professions benefit from the use of an object oriented class hierarchy, that provides structure from which component products are defined and used without the extensive knowledge of procedural programming languages. In this way, sales professionals may provide enhanced online sales to potential customers by reducing the lag time between the modeling of the customizable product configurator and the runtime instance. In addition, the expert logic, provided by the class rules, allows the consumer to purchase an optimal customizable product, to their specific needs and budget, as if a sales professional was present to guide the consumer.

Figure 8:
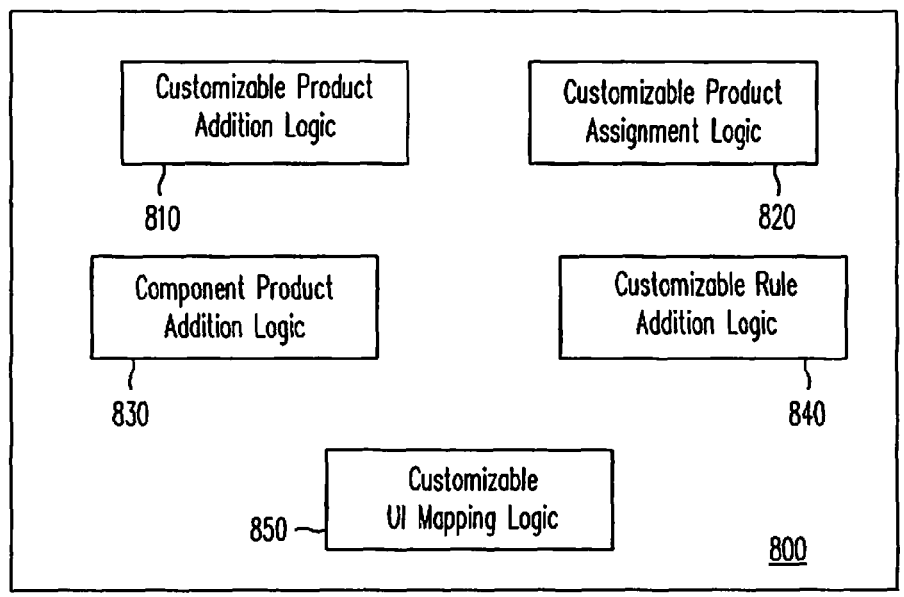
FIG. 8 illustrates a medium or media useful for an embodiment of a process to generate a customizable product configurator.

FIG. 8 illustrates a medium or media useful for an embodiment of a process to generate a customizable product configurator. Each of the blocks of medium 800 may be implemented separately or in combination with other blocks and not all blocks need be implemented. Block 810 includes Customizable Product Creation logic which may be used to create a customizable product with defined attributes. Block 820 includes Customizable Product Assignment Logic that may assign a customizable product to a class. Block 830 includes a Component Product Addition Logic that may add component product subclasses to the customizable product class. In this way, the attributes inherit from the customizable product class. Block 830 includes a Customizable Rule Addition Logic that may add rules to the customizable product class, thereby providing conditions to component product addition logic. Block 840 includes a Customizable UI Mapping Logic that may configure a user interface to the customizable product class.

Some portions of the detailed description are presented in terms of algorithms and symbolic representations of operations on data bits within a computer memory. These algorithmic descriptions and representations are the means used by those skilled in the art to most effectively convey the substance of their work to others skilled in the art. An algorithm as described here is generally conceived to be a self consistent sequence of acts or operations leading to a desired result. The acts are those requiring physical manipulations of physical quantities. Usually, though not necessarily, these quantities take the form of electrical or magnetic signals capable of being stored, transferred, combined, compared and otherwise manipulated. It has proven convenient at times principally for reasons of common usage to refer to these signals as bits, values, elements, symbols, characters, terms, numbers, data or the like.

It should be borne in mind, however, that all of these in similar terms are to be associated with the appropriate physical quantities and are merely convenient labels applied to these quantities. Unless specifically stated otherwise as apparent from the following discussion it is appreciated that throughout the description discussions utilizing terms such as "processing" or "computing" or "calculating" or "determining" or "displaying" or the like refer to the action and processes of a computer system or similar electronic computing device that manipulates and transforms data represented as physical (electronic) quantities within the computer systems registers and memories into other data similarly represented as physical quantities within the computer system memories or registers or other such information storage transmission or display devices. The present invention can be implemented by an apparatus for performing the operations herein. This apparatus may be specially constructed for the required purposes or it may comprise a machine such as a general purpose computer selectively activated or reconfigured by a computer program (such as a collection of instructions for execution by a machine or processor for example) stored in the computer. Such a computer program may be stored in a computer readable storage medium such as but not limited to any type of disk including floppy disks, optical disks, CD roms and magnetic optical disks, read only memories, random access memories, EPROMS, EEPROMS, magnetic or optical cards or any type of media suitable for storing electronic constructions and each coupled to a computer system bus. Each of these media may be coupled to a computer system bus through use of an appropriate device for reading and or writing the media in question. Specialty apparatus may include a collection of readily available pieces or an application specific integrated circuit including a series of logic blocks for example. The blocks of FIG. 1, 6, or 8 may be suitable for implementation as logic blocks, as may other configurations of the method, system and apparatus described herein.

The algorithms and displays presented herein are not inherently related to any particular computer or other apparatus. Various general purpose systems may be used with programs in accordance with the teachings herein or it may prove convenient to construct more specialized apparatus to perform the required method. For example, any of the methods according to the present invention can be implemented in hard wired circuitry by programming a general purpose processor or by any combination of hardware and software. One of skill in the art will immediately appreciate that the invention can be practiced with computer system configuration. Configurations other than those described including hand held devices, multi processor systems, microprocessor based or programmable consumer electronics, network PCs, mini computers, main frame computers and the like. The invention may also be practiced in distributed computing environments or tasks or performed by remote processing devices that are linked through a communications network. The required structure for a variety of these systems appear from the description above.

The methods of the invention may be implemented using computer software. If written in a programming language conforming to a recognized standard sequences of instructions designed to implement the methods can be compiled for execution on a variety of hardware platforms or machines and for interface to a variety of operating systems. In addition the present invention is not described with reference to any particular programming language. It will be appreciated that a variety of programming languages may be used to implement the teachings of invention as described herein. Furthermore, it is common in the art to speak of software in one form or another (for example program procedure application etc. . . . ) as taken in action or causing a result. Such expressions are merely a shorthand way of saying that execution of the software by a computer causes the processor of the computer to perform an action or produce a result.

While the invention has been described in terms of several embodiments, those skilled in the art will recognize that the invention is not limited to the embodiments described. The method and apparatus of the invention may be practiced with modification and alteration within the spirit and scope of the appended claims. The description is thus to be regarded as illustrative instead of limiting on the invention.

What is claimed is:

1. A method comprising:
   generating a first configurator for a customizable product, wherein the generating the first configurator comprises performing the operations of
      creating a customizable product, wherein
         the customizable product comprises a set of one or more attributes, and
         the set of one or more attributes is configured to define, at least in part, the customizable product,
      assigning the customizable product to a customizable product class, wherein
         the customizable product class is a parent class of a hierarchy defining the first configurator,
      adding a component product class to the customizable product class, wherein
         the component product class is a subclass of the customizable product,
      adding a customizable class rule to the customizable product class, wherein
         the customizable class rule comprises
            one or more expressions, and
               the one or more expressions are configured to define one or more constraints on one or more component products added to the customizable product, and
      mapping a customizable user interface (UI) to the customizable product class,
         wherein
            the customizable UI is configured to provide access structure to the first configurator; and
   generating a second configurator for another customizable product, wherein
      the generating the second configurator comprises performing at least one of the operations on the another customizable product.

2. The method of claim 1, further comprising:
   adding one or more component product classes to a port; and
   adding the port to the customizable product class, wherein
      the port is configured to allow the first configurator to classify a group of component products.

3. The method of claim 2, wherein
   the port comprises
      a cardinality attribute, and
   the cardinality attribute is configured to constrain the number of component products to
      be added by the first configurator.

4. The method of claim 3, wherein
   the cardinality attribute comprises at least one of
      a minimum cardinality, or
      a maximum cardinality,
   the minimum cardinality is configured to constrain the minimum number of component
      products to be added by the first configurator, and
   the maximum cardinality is configured to constrain the maximum number of component
      products to be added by the first configurator.

5. The method of claim 3, wherein
   the cardinality attribute comprises
      a default cardinality, and
   the default cardinality defines a quantity of the component product class to be added by
      the first configurator.

6. The method of claim 1, wherein
   the one or more expressions comprise at least one of
      a property path,
      a constant, or
      an operator.

7. The method of claim 1, wherein
   the customizable class rule uses a natural language syntax.

8. The method of claim 1, wherein
   the customizable class rule is a subclass of the customizable product class,
   the component product class automatically inherits the attributes of the customizable product class, wherein
      the component product class comprises a plurality of related products complementary to the customizable product, and
   the component product class inherits the customizable class rule of the customizable product class, wherein
      the customizable product class is associated with a plurality of modifiable attributes, and
      the attributes comprise information about the customizable product class and the component product class defined by a configuration expert.

9. The method of claim 1, wherein
   the component product class comprises
      a static attribute, and
   the static attribute is not associated with a parent class.

10. The method of claim 1, wherein
    the customizable product is configured as an object oriented structure, wherein the
    configuration comprises
       a modeling session, wherein
          the first configurator is generated during a modeling session to customize the customizable product based on the customizable class rule,
          the first configurator is mapped to the customizable user interface to customize the product based on an input from a configuration expert, and
          the input comprises a modification to the customizable class rule based on the customizable product,
          the customizable product comprises versioning information,
          the component product class comprises one or more component product subclasses, and
             a plurality of related products associated with the customizable product class,
       at least one of the one or more component product subclasses is configured to inherit an attribute of the one or more attributes of the customizable product class, and
    the attribute is of type string, number, date, and Boolean.

11. A computer program product comprising:
    a plurality of instructions, comprising
       a first set of instructions, executable on a computer system, configured to generate a first configurator for a customizable product, wherein
          the first set of instructions comprises a first subset of instructions, executable on the computer system, configured to create a customizable product, wherein the customizable product comprises
a set of one or more attributes, and
the set of one or more attributes is configured to define, at least in part, the customizable product,
a second subset of instructions, executable on the computer system, configured to assign the customizable product to a customizable product class, wherein
the customizable product class is a parent class of a hierarchy defining the first configurator,
a third subset of instructions, executable on the computer system, configured to add a component product class to the customizable product class, wherein
the component product class is a subclass of the customizable product,
a fourth subset of instructions, executable on the computer system, configured to add a customizable class rule to the customizable product class, wherein
the customizable class rule comprises one or more expressions, and
the one or more expressions are configured to define one or more constraints on one or more component products added to the customizable product, and
a fifth subset of instructions, executable on the computer system, configured to map a customizable user interface (UI) to the customizable product class, wherein
the customizable UI is configured to provide access structure to the first configurator, and
a second set of instructions, executable on the computer system, configured to generate a second configurator for another customizable product wherein,
the second set of instructions comprises at least one subset of the first, the second, the third, the fourth, or the fifth subsets of instructions, and
the second set of instructions are performed on the another customizable product; and
a non-transitory computer-readable storage medium, wherein the instructions are encoded in the non-transitory computer-readable storage medium.

12. The computer program product of claim 11, wherein the first set of instructions comprises:
a sixth subset of instructions, executable on the computer system, configured to add one or more component product classes to a port; and
a seventh subset of instructions, executable on the computer system, configured to add the port to the customizable product class, wherein
the port is configured to allow the first configurator to classify a group of component products.

13. The computer program product of claim 12, wherein the port comprises
a cardinality attribute, and
the cardinality attribute is configured to constrain the number of component products to be added by the first configurator.

14. The computer program product of claim 13, wherein the cardinality attribute comprises at least one of
a minimum cardinality, or
a maximum cardinality,
the minimum cardinality is configured to constrain the minimum number of component products to be added by the first configurator, and
the maximum cardinality is configured to constrain the maximum number of component products to be added by the first configurator.

15. The computer program product of claim 13, wherein the cardinality attribute comprises
a default cardinality, and
the default cardinality defines a quantity of the component product class to be added by the first configurator.

16. A computer system comprising:
a processor;
a non-transitory computer-readable storage medium coupled to the processor; and
a plurality of instructions, encoded in the non-transitory computer-readable storage medium and configured to cause the processor to
generate a first configurator for a customizable product, wherein
the instructions configured to cause the processor to generate the first configurator comprise a first set of instructions configured to cause the processor to
create a customizable product, wherein
the customizable product comprises a set of one or more attributes, and
the set of one or more attributes is configured to define, at least in part, the customizable product,
assign the customizable product to a customizable product class, wherein
the customizable product class is a parent class of a hierarchy defining the first configurator,
add a component product class to the customizable product class, wherein
the component product class is a subclass of the customizable product,
add a customizable class rule to the customizable product class, wherein
the customizable class rule comprises one or more expressions, and
the one or more expressions are configured to define one or more constraints on one or more component products added to the customizable product, and
map a customizable user interface (UI) to the customizable product class, wherein
the customizable UI is configured to provide access structure to the first configurator, and
generate a second configurator for another customizable product, wherein
the instructions configured to cause the processor to generate the second configurator comprise at least one of the instructions performed in generating the first configurator, and
the at least one of the instructions is performed on the another customizable product.

17. The computer system of claim 16, wherein the first configurator comprises:
the customizable product class;
a component product, wherein
the component product is of a subclass of the customizable product,
the component product is configured to inherit at least one attribute of the set of one or more attributes from the customizable product class;
the customizable class rule; and
the customizable UI.

18. The computer system of claim 16, wherein the first configurator comprises:
 a port, wherein
  the port comprises
   a set of one or more of the component products.
19. The computer system of claim 16, wherein the first configurator comprises:
 a second customizable product, wherein
  the component product comprises
   one or more of a second customizable product.
20. The computer system of claim 16, wherein
 the class rule comprises
  a natural language template, and
 the natural language template uses a natural language syntax.
21. The computer system of claim 16, wherein
 the class rule comprises at least one of
  a batch rule, or
  a predicate-based customizable class rule.
22. The computer system of claim 16, wherein the first configurator comprises:
 an operator property, wherein
  the operator property is configured to enable a function to be performed within an expression of the one or more expressions, and
  the expression comprises a property path.

\* \* \* \* \*

UNITED STATES PATENT AND TRADEMARK OFFICE
CERTIFICATE OF CORRECTION

| | | |
|---|---|---|
| PATENT NO. | : 8,812,966 B2 | Page 1 of 1 |
| APPLICATION NO. | : 12/871339 | |
| DATED | : August 19, 2014 | |
| INVENTOR(S) | : Brunner et al. | |

It is certified that error appears in the above-identified patent and that said Letters Patent is hereby corrected as shown below:

In the Specification

In column 1, line 21, delete "purposes" and insert -- purposes. --, therefor.

In column 16, line 30, delete "and or" and insert -- and/or --, therefor.

Signed and Sealed this
Tenth Day of March, 2015

Michelle K. Lee
*Deputy Director of the United States Patent and Trademark Office*